US006640547B2

(12) United States Patent
Leahy, Jr.

(10) Patent No.: US 6,640,547 B2

(45) **Date of Patent: *Nov. 4, 2003**

(54) EFFUSION COOLED TRANSITION DUCT WITH SHAPED COOLING HOLES

(75) Inventor: James H. Leahy, Jr., Tequesta, FL (US)

(73) Assignee: Power Systems Mfg, LLC, Jupiter, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/280,173

(22) Filed: Oct. 25, 2002

(65) Prior Publication Data

US 2003/0106318 A1 Jun. 12, 2003

Related U.S. Application Data

(63) Continuation-in-part of application No. 09/683,290, filed on Dec. 10, 2001, now Pat. No. 6,568,187.

(51) Int. Cl.[7] .............................. F02C 3/14; F02C 7/18

(52) U.S. Cl. .............................. 60/752; 60/754; 60/757

(58) Field of Search .......................... 60/752, 754, 755, 60/756, 757, 759, 600, 39.37, 798, 800

(56) References Cited

U.S. PATENT DOCUMENTS

| | | | | |
|---|---|---|---|---|
| 4,719,748 A | | 1/1988 | Davis, Jr. et al. | |
| 4,848,081 A | | 7/1989 | Kennedy | |
| 4,903,477 A | | 2/1990 | Butt | |
| 4,992,025 A | | 2/1991 | Stroud et al. | |
| 5,096,379 A | | 3/1992 | Stroud et al. | |
| 5,241,827 A | | 9/1993 | Lampes | |
| 5,605,639 A | | 2/1997 | Banks et al. | |
| 5,683,600 A | | 11/1997 | Kelley et al. | |
| 5,758,504 A | * | 6/1998 | Abreu et al. | 60/754 |
| 6,006,523 A | * | 12/1999 | Mandai et al. | 60/722 |
| 6,036,436 A | | 3/2000 | Fukuno et al. | |
| 6,243,948 B1 | | 6/2001 | Lee et al. | |
| 6,287,075 B1 | | 9/2001 | Kercher | |
| 6,329,015 B1 | | 12/2001 | Fehrenbach et al. | |
| 6,408,629 B1 | | 6/2002 | Harris et al. | |
| 6,427,446 B1 | * | 8/2002 | Kraft et al. | 60/737 |
| 6,568,187 B1 | * | 5/2003 | Jorgensen et al. | 60/752 |

* cited by examiner

*Primary Examiner*—Ted Kim

(74) *Attorney, Agent, or Firm*—Brian R. Mack

(57) ABSTRACT

An effusion cooled transition duct for transferring hot gases from a combustor to a turbine is disclosed. The transition duct includes a panel assembly with a generally cylindrical inlet end and a generally rectangular exit end with an increased first and second radius of curvature, a generally cylindrical inlet flange, and a generally rectangular end frame. Cooling of the transition duct is accomplished by a plurality of holes angled towards the end frame of the transition duct and drilled at an acute angle relative to the outer wall of the transition duct. The combination of the increase in radii of curvature of the panel assembly with the effusion cooling holes reduces component stresses and increases component life. An alternate embodiment of the present invention is shown which discloses shaped angled holes for improving the film cooling effectiveness of effusion holes on a transition duct while reducing film blow off.

9 Claims, 9 Drawing Sheets

EFFUSION COOLED TRANSITION DUCT WITH SHAPED COOLING HOLES

This is a continuation-in-part of U.S. Pat. No. 6,568,187 which is assigned to the assignee hereof.

BACKGROUND OF INVENTION

This invention applies to the combustor section of gas turbine engines used in powerplants to generate electricity. More specifically, this invention relates to the structure that transfers hot combustion gases from a can-annular combustor to the inlet of a turbine.

In a typical can annular gas turbine combustor, a plurality of combustors is arranged in an annular array about the engine. The hot gases exiting the combustors are utilized to turn the turbine, which is coupled to a shaft that drives a generator for generating electricity. The hot gases are transferred from the combustor to the turbine by a transition duct. Due to the position of the combustors relative to the turbine inlet, the transition duct must change cross-sectional shape from a generally cylindrical shape at the combustor exit to a generally rectangular shape at the turbine inlet, as well as change radial position, since the combustors are typically mounted radially outboard of the turbine.

The combination of complex geometry changes as well as excessive temperatures seen by the transition duct create a harsh operating environment that can lead to premature repair and replacement of the transition ducts. To withstand the hot temperatures from the combustor gases, transition ducts are typically cooled, usually by air, either with internal cooling channels or impingement cooling. Catastrophic cracking has been seen in internally air-cooled transition ducts with excessive geometry changes that operate in this high temperature environment. Through extensive analysis, this cracking can be attributed to a variety of factors. Specifically, high steady stresses have been found in the region around the aft end of the transition duct where sharp geometry changes occur. In addition stress concentrations have been found that can be attributed to sharp corners where cooling holes intersect the internal cooling channels in the transition duct. Further complicating the high stress conditions are extreme temperature differences between components of the transition duct.

The present invention seeks to overcome the shortfalls described in the prior art and will now be described with particular reference to the accompanying drawings.

DETAILED DESCRIPTION

Figure 1:
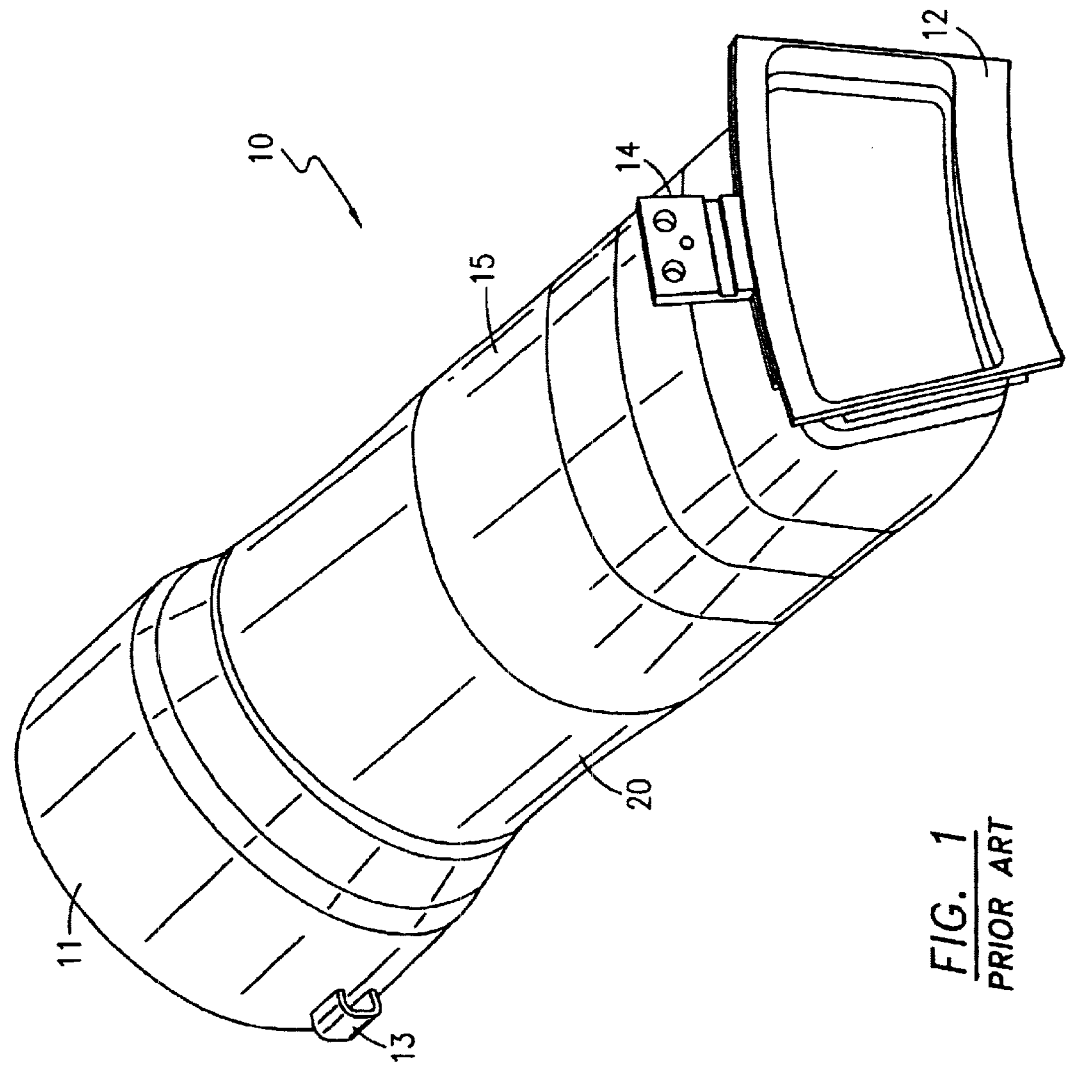
FIG. 1 PRIOR ART
FIG. 1 is a perspective view of a prior art transition duct.
Figure 2:
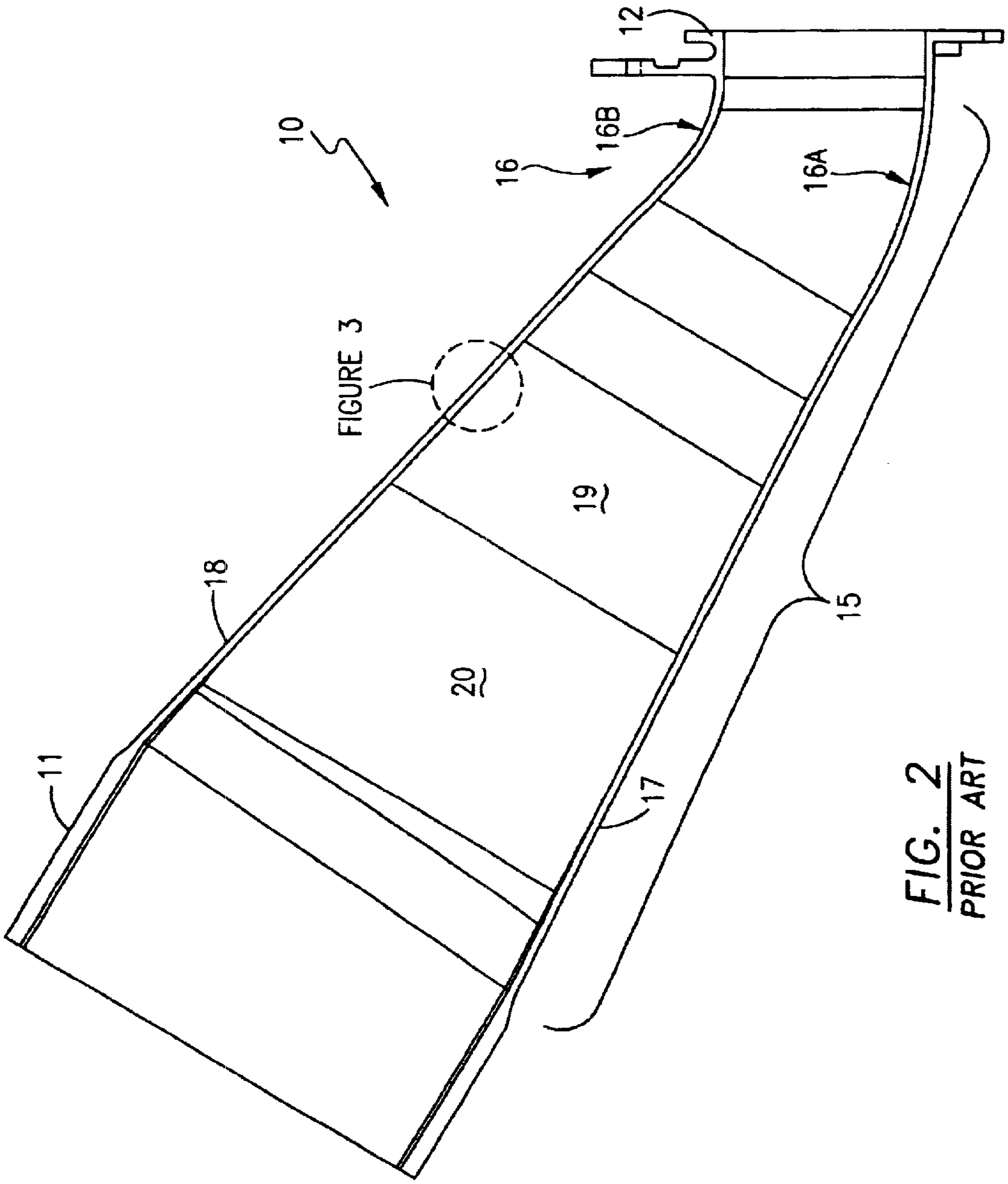
FIG. 2 PRIOR ART
FIG. 2 is a cross section view of a prior art transition duct.

Referring to FIG. 1, a transition duct 10 of the prior art is shown in perspective view. The transition duct includes a generally cylindrical inlet flange 11 and a generally rectangular exit frame 12. The can-annular combustor (not shown) engages transition duct 10 at inlet flange 11. The hot combustion gases pass through transition duct 10 and pass through exit frame 12 and into the turbine (not shown). Transition duct 10 is mounted to the engine by a forward mounting means 13, fixed to the outside surface of inlet flange 11 and mounted to the turbine by an aft mounting means 14, which is fixed to exit frame 12. A panel assembly 15, connects inlet flange 11 to exit frame 12 and provides the change in geometric shape for transition duct 10. This change in geometric shape is shown in greater detail in FIG. 2.

The panel assembly 15, which extends between inlet flange 11 and exit frame 12 and includes a first panel 17 and a second panel 18, tapers from a generally cylindrical shape at inlet flange 11 to a generally rectangular shape at exit frame 12. The majority of this taper occurs towards the aft end of panel assembly 15 near exit frame 12 in a region of curvature 16. This region of curvature includes two radii of curvature, 16A on first panel 17 and 16B on second panel 18. Panels 17 and 18 each consist of a plurality of layers of sheet metal pressed together to form channels in between the layers of metal. Air passes through these channels to cool transition duct 10 and maintain metal temperatures of panel assembly 15 within an acceptable range. This cooling configuration is detailed in FIG. 3.

Figure 3:
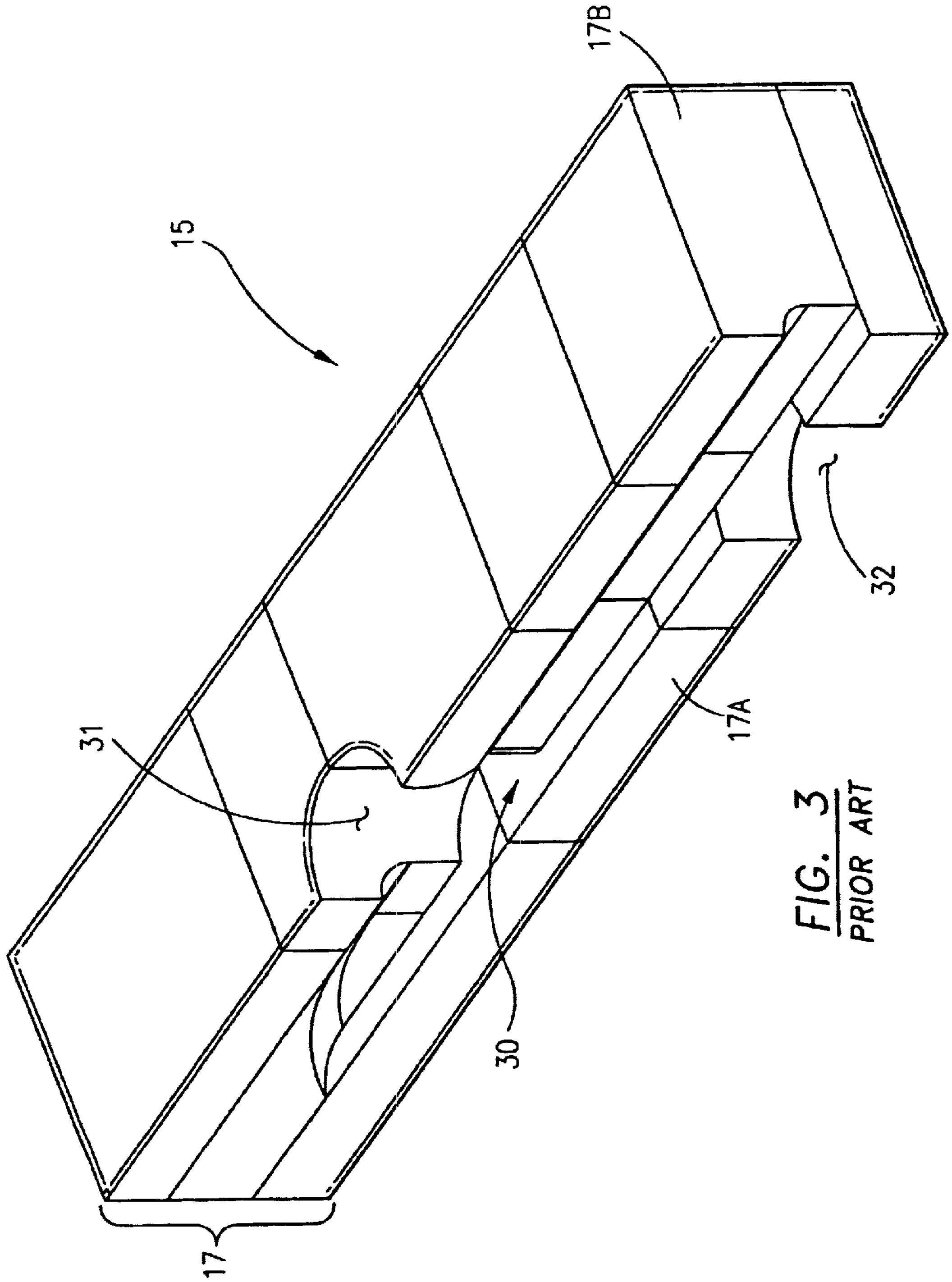
FIG. 3 PRIOR ART
FIG. 3 is a perspective view of a portion of the prior art transition duct cooling arrangement.
Figure 4:
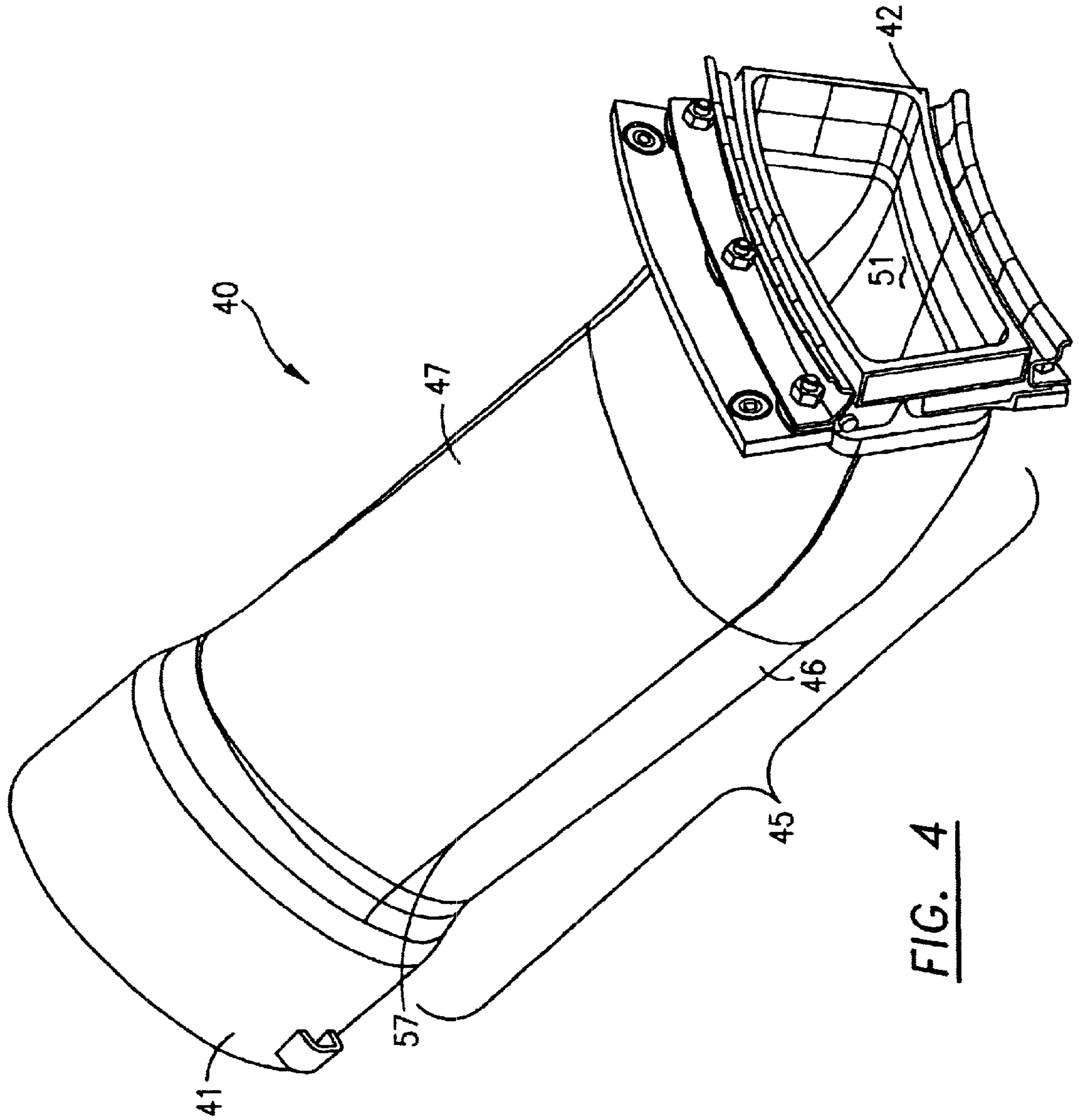
FIG. 4 is a perspective view of the present invention transition duct.
Figure 5:
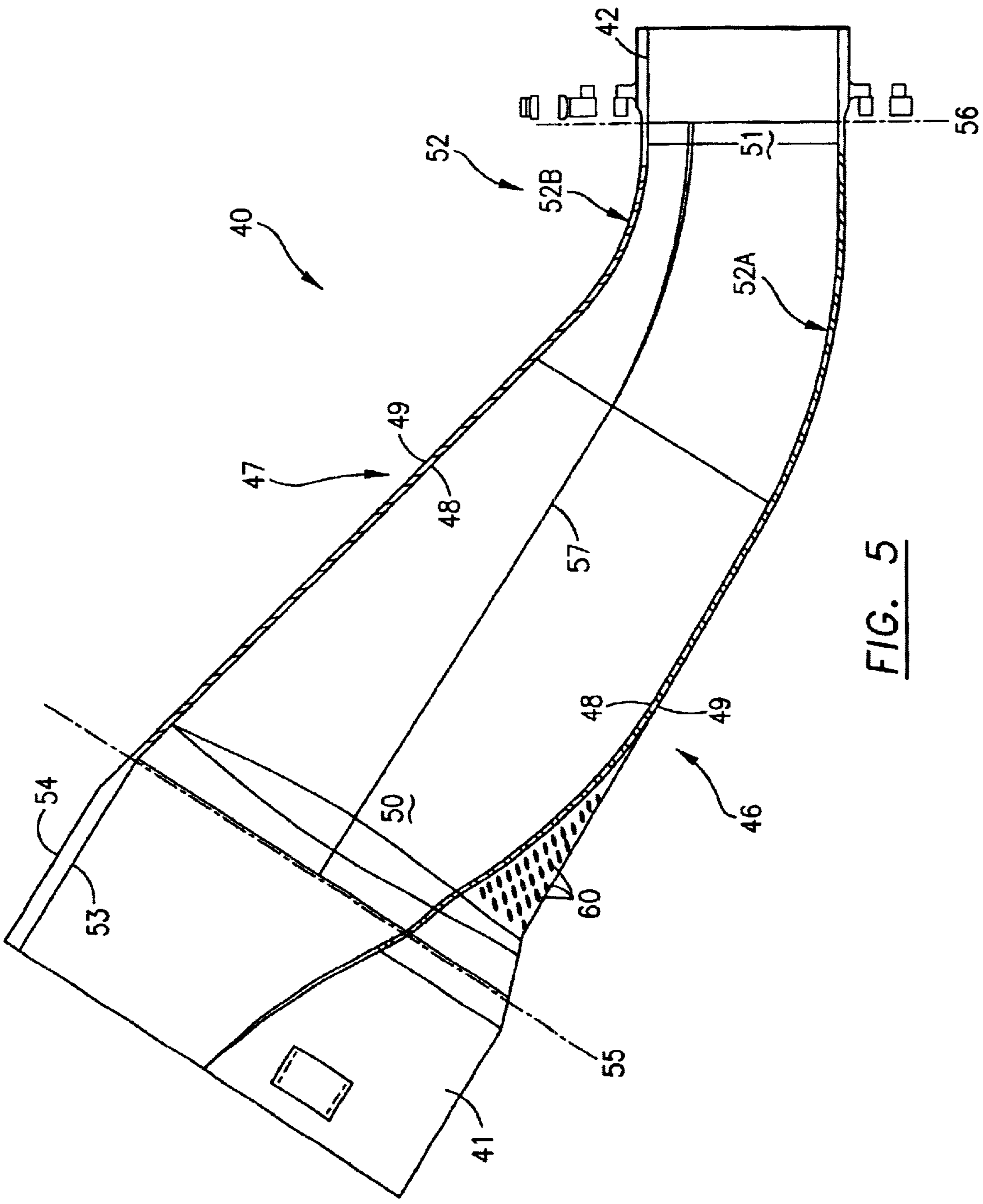
FIG. 5 is a cross section view of the present invention transition duct.
Figure 6:
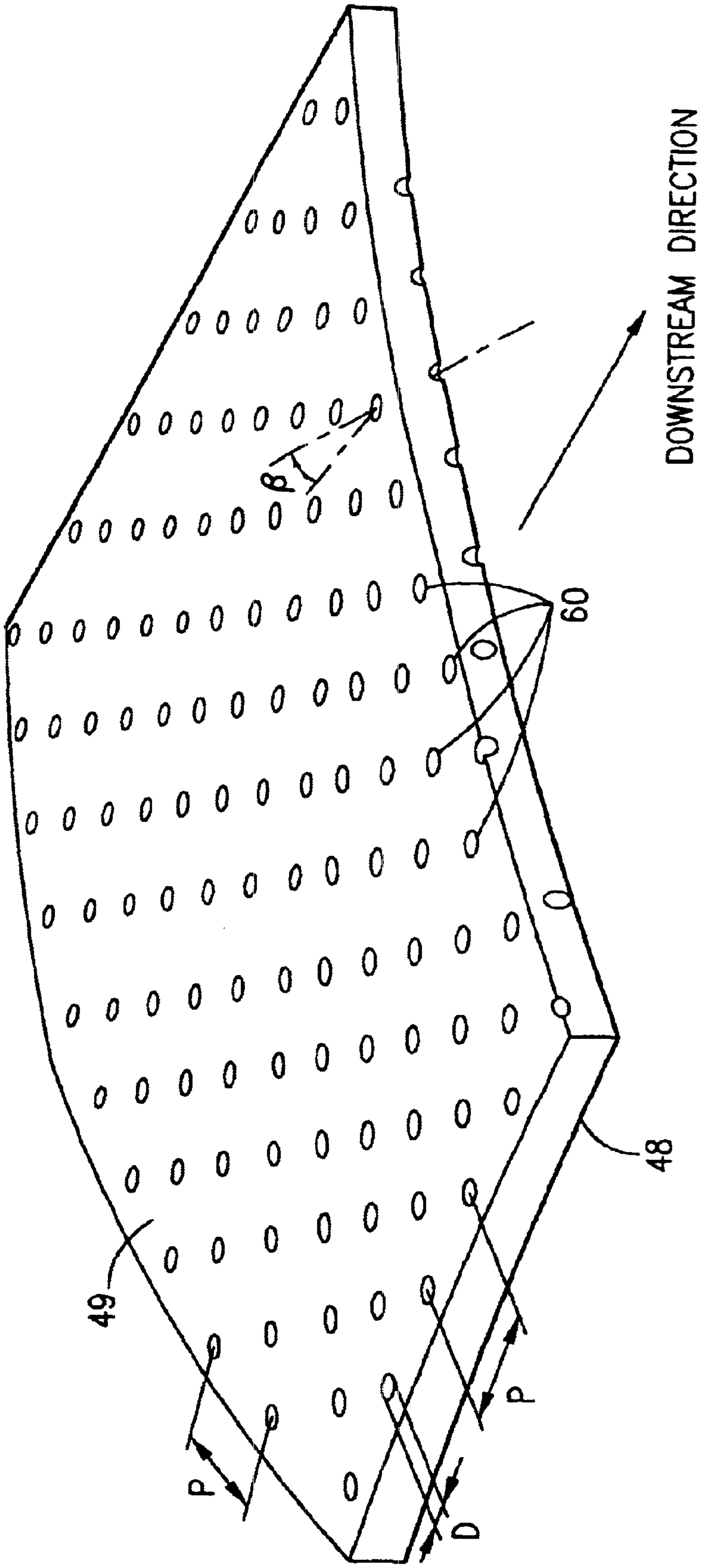
FIG. 6 is a perspective view of a portion of the present invention transition duct cooling arrangement.

A cutaway view of panel assembly 15 with details of the channel cooling arrangement is shown in detail in FIG. 3. Channel 30 is formed between layers 17A and 17B of panel 17 within panel assembly 15. Cooling air enters duct 10 through inlet hole 31, passes through channel 30, thereby cooling panel layer 17A, and exits into duct gaspath 19 through exit hole 32. This cooling method provides an adequate amount of cooling in local regions, yet has drawbacks in terms of manufacturing difficulty and cost, and has been found to contribute to cracking of ducts when combined with the geometry and operating conditions of the prior art. The present invention, an improved transition duct incorporating effusion cooling and geometry changes, is disclosed below and shown in FIGS. 4–6.

An improved transition duct 40 includes a generally cylindrical inlet flange 41, a generally rectangular aft end frame 42, and a panel assembly 45. Panel assembly 45 includes a first panel 46 and a second panel 47, each constructed from a single sheet of metal at least 0.125 inches thick. The panel assembly, inlet flange, and end frame are typically constructed from a nick-base superalloy such as Inconel 625. Panel 46 is fixed to panel 47 by a means such as welding, forming a duct having an inner wall 48, an outer wall 49, a generally cylindrical inlet end 50, and a generally rectangular exit end 51. Inlet flange 41 is fixed to panel assembly 45 at cylindrical inlet end 50 while aft end frame 42 is fixed to panel assembly 45 at rectangular exit end 51.

Transition duct 40 includes a region of curvature 52 where the generally cylindrical duct tapers into the generally rectangular shape. A first radius of curvature 52A, located along first panel 46, is at least 10 inches while a second radius of curvature 52B, located along second panel 47, is at least 3 inches. This region of curvature is greater than that of the prior art and serves to provide a more gradual curvature of panel assembly 45 towards end frame 42. A more gradual curvature allows operating stresses to spread throughout the panel assembly and not concentrate in one section. The result is lower operating stresses for transition duct 40.

The improved transition duct 40 utilizes an effusion-type cooling scheme consisting of a plurality of cooling holes 60 extending from outer wall 49 to inner wall 48 of panel assembly 45. Cooling holes 60 are drilled, at a diameter D, in a downstream direction towards aft end frame 42, with the holes forming an acute angle β relative to outer wall 49. Angled cooling holes provide an increase in cooling effectiveness for a known amount of cooling air due to the extra length of the hole, and hence extra material being cooled. In order to provide a uniform cooling pattern, the spacing of the cooling holes is a function of the hole diameter, such that there is a greater distance between holes as the hole size increases, for a known thickness of material.

Acceptable cooling schemes for the present invention can vary based on the operating conditions, but one such scheme includes cooling holes 60 with diameter D of at least 0.040 inches at a maximum angle β to outer wall 49 of 30 degrees with the hole-to-hole spacing, P, in the axial and transverse direction following the relationship: $P \leqq (15 \times D)$. Such a hole spacing will result in a surface area coverage by cooling holes of at least 20%.

Utilizing this effusion-type cooling scheme eliminates the need for multiple layers of sheet metal with internal cooling channels and holes that can be complex and costly to manufacture. In addition, effusion-type cooling provides a more uniform cooling pattern throughout the transition duct. This improved cooling scheme in combination with the more gradual geometric curvature disclosed will reduce operating stresses in the transition duct and produce a more reliable component requiring less frequent replacement.

In an alternate embodiment of the present invention, a transition duct containing a plurality of tapered cooling holes is disclosed. It has been determined that increasing the hole diameter towards the cooling hole exit region, which is proximate the hot combustion gases of a transition duct, reduces cooling fluid exit velocity and potential film blow-off. In an effusion cooled transition duct, cooling fluid not only cools the panel assembly wall as it passes through the hole, but the hole is angled in order to lay a film of cooling fluid along the surface of the panel assembly inner wall in order to provide surface cooling in between rows of cooling holes. Film blow-off occurs when the velocity of a cooling fluid exiting a cooling hole is high enough to penetrate into the main stream of hot combustion gases. As a result, the cooling fluid mixes with the hot combustion gases instead of remaining as a layer of cooling film along the panel assembly inner wall to actively cool the inner wall in between rows of cooling holes. By increasing the exit diameter of a cooling hole, the cross sectional area of the cooling hole at the exit plane is increased, and for a given amount of cooling fluid, the exit velocity will decrease compared to the entrance velocity. Therefore, penetration of the cooling fluid into the flow of hot combustion gases is reduced and the cooling fluid tends to remain along the panel assembly inner wall of the transition duct, thereby providing an improved film of cooling fluid, which results in a more efficient cooling design for a transition duct.

Figure 7:
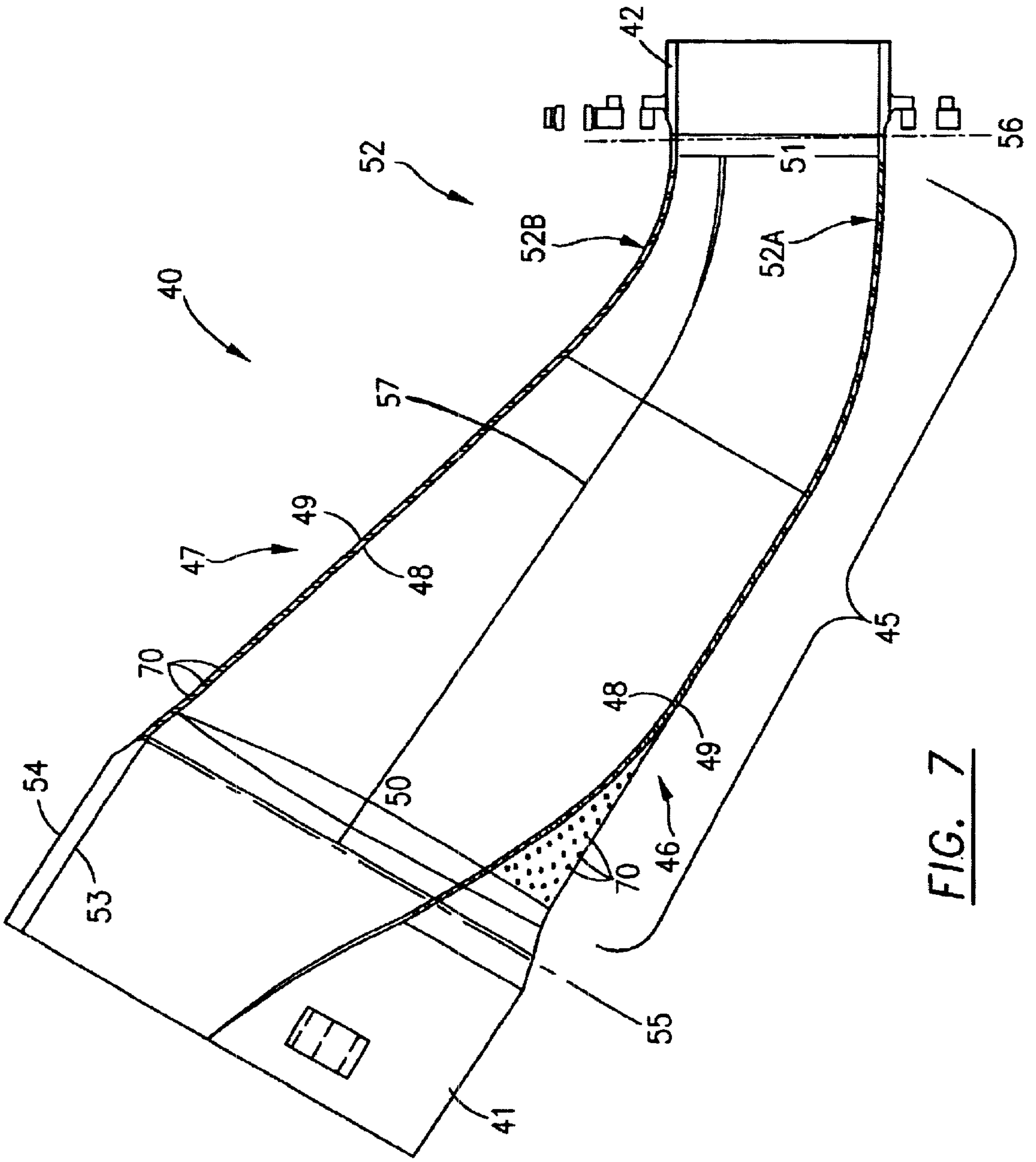
FIG. 7 is a cross section view of an alternate embodiment of the present invention disclosing an alternate type of cooling holes for a transition duct.
Figure 8:
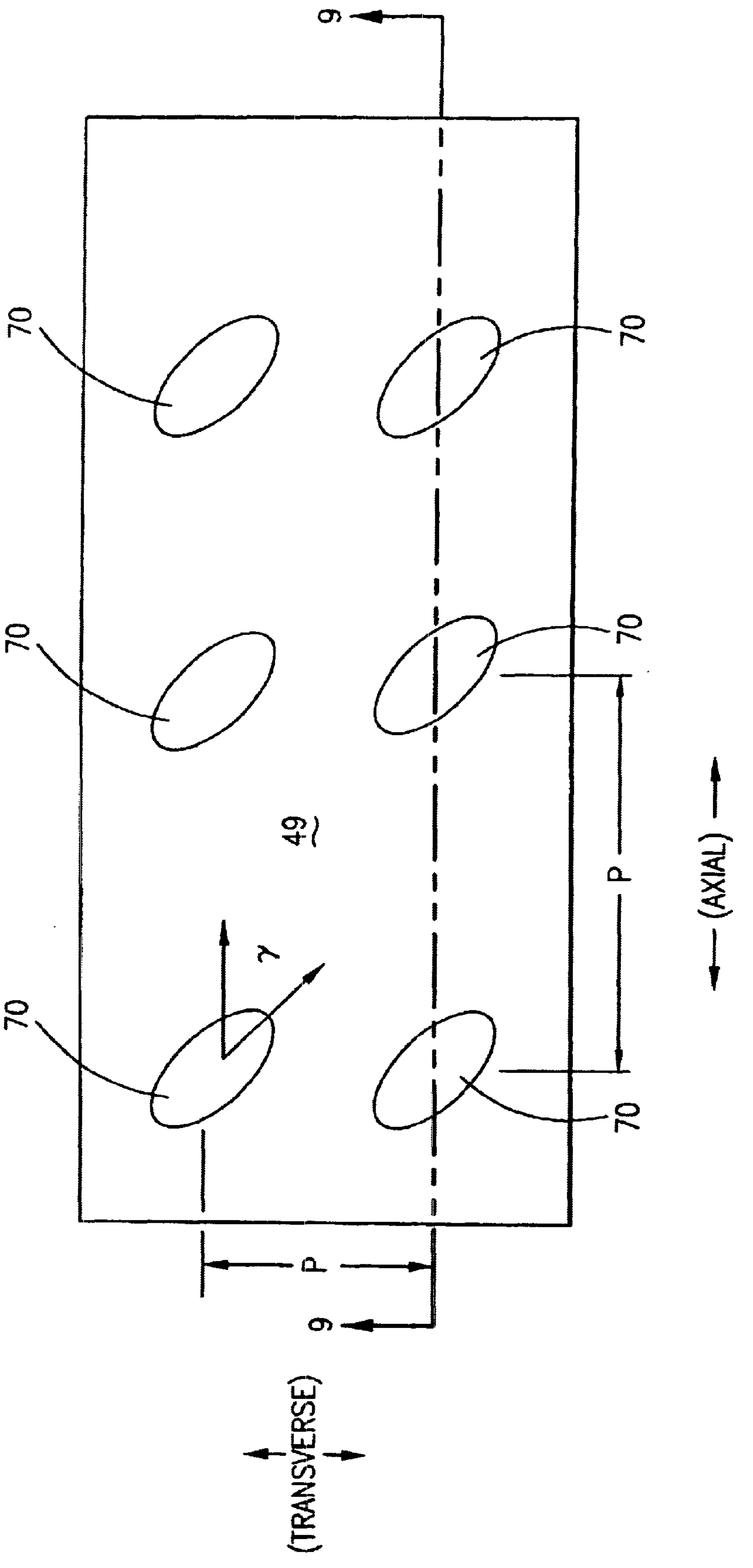
FIG. 8 is a top view of a portion of an alternate embodiment of the present invention disclosing an alternate type of cooling holes for a transition duct.
Figure 9:
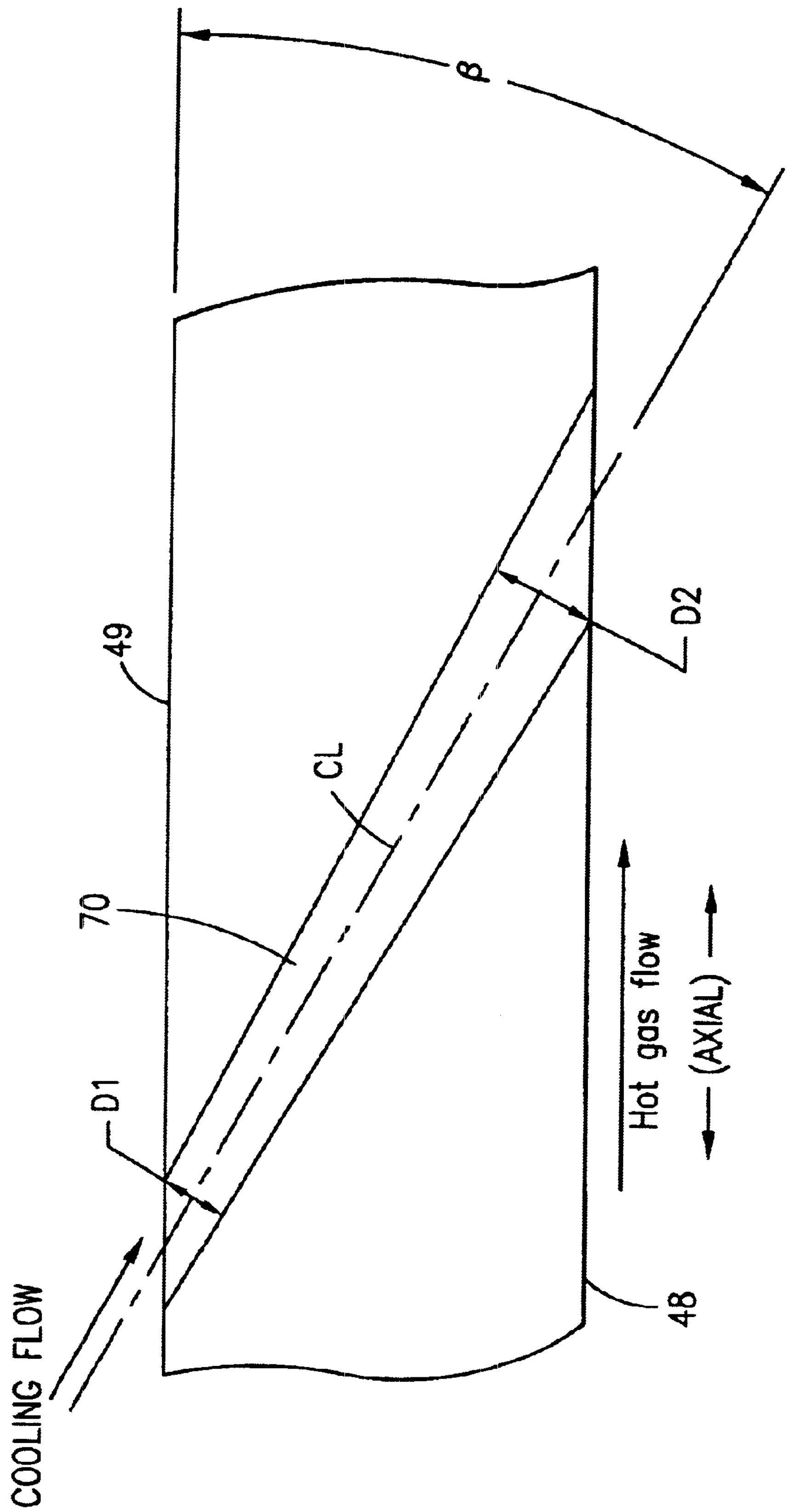
FIG. 9 is a section view taken through the portion of an alternate embodiment of the present invention shown in FIG. 8, disclosing an alternate type of cooling holes for a transition duct.

Referring now to FIGS. 7–9, an alternate embodiment of the present invention incorporating shaped film cooling holes is shown in detail. Features of the alternate embodiment of the present invention are identical to those shown in FIGS. 3–6 with the exception of the cooling holes used for the effusion cooling design. Transition duct 40 includes a panel assembly 45 formed from first panel 46 and second panel 47, which are each fabricated from a single sheet of metal, and fixed together by a means such as welding along a plurality of axial seams 57 to form panel assembly 45. As a result, panel assembly 45 contains an inner wall 48 and outer wall 49 and a thickness therebetween. As with the preferred embodiment, the alternate embodiment contains a generally cylindrical inlet end 50 and a generally rectangular exit end 51 with inlet end 50 defining a first plane 55 and exit end 51 defining a second plane 56 with first plane 55 oriented at an angle relative to second plane 56. Fixed to inlet end 50 of panel assembly 45 is a generally cylindrical inlet sleeve 41 having an inner diameter 53 and outer diameter 54, while fixed to outlet end 51 of panel assembly 45 is a generally rectangular aft end frame 42. It is preferable that panel assembly 45, inlet sleeve 41, and aft end frame 42 are manufactured from a nickel-base superalloy such a Inconnel 625 with panel assembly 45 having a thickness of at least 0.125 inches.

The alternate embodiment of the present invention, transition duct 40 contains a plurality of cooling holes 70 located in panel assembly 45, with cooling holes 70 found in both first panel 46 and second panel 47. Each of cooling holes 70 are separated from an adjacent cooling hole in the axial and transverse direction by a distance P as shown in FIG. 8, with the axial direction being substantially parallel to the flow of gases through transition duct 40 and the transverse direction generally perpendicular to the axial direction. Cooling holes 70 are spaced throughout panel assembly 45 in such a manner as to provide uniform cooling to panel assembly 45. It has been determined that for this configuration, the most effective distance P between cooling holes 70 is at least 0.2 inches with a maximum distance P of 2.0 inches in the axial direction and 0.4 inches in the transverse direction.

Referring now to FIG. 9, cooling holes 70 extend from outer wall 49 to inner wall 48 of panel assembly 45 with each of cooling holes 70 drilled at an acute surface angle β relative to outer wall 49. Cooling holes 70 are drilled in panel assembly 45 from outer wall 49 towards inner wall 48, such that when in operation, cooling fluid flows towards the aft end of transition duct 40. Furthermore, cooling holes 70 are also drilled at a transverse angle γ, as shown in FIG. 8, where γ is measured from the axial direction, which is generally parallel to the flow of hot combustion gases. Typically, acute surface angle β ranges between 15 degrees and 30 degrees as measured from outer wall 49 while transverse angle γ measures between 30 degrees and 45 degrees.

An additional feature of cooling holes 70 is the shape of the cooling hole. Referring again to FIG. 9, cooling holes 70 have a first diameter D1 and a second diameter D2 such that both diameters D1 and D2 are measured perpendicular to a centerline CL of cooling hole 70 where cooling hole 70 intersects outer wall 49 and inner wall 48. Cooling holes 70 are sized such that second diameter D2 is greater than first diameter D1 thereby resulting in a generally conical shape. It is preferred that cooling holes 70 have a first diameter D1 of at least 0.025 inches while having a second diameter D2 of at least 0.045 inches. Utilizing a generally conical hole results in reduced cooling fluid velocity at second diameter D2 compared to fluid velocity at first diameter D1. A reduction in fluid velocity within cooling hole 70 will allow for the cooling fluid to remain as a film along inner wall 48 once it exits cooling hole 70. This improved film cooling effectiveness results in improved overall heat transfer and transition duct durability.

While the invention has been described in what is known as presently the preferred embodiment, it is to be understood that the invention is not to be limited to the disclosed embodiment but, on the contrary, is intended to cover various modifications and equivalent arrangements within the scope of the following claims.

I claim:

1. An effusion cooled transition duct for transferring hot gases from a combustor to a turbine comprising:

a panel assembly comprising:

a first panel formed from a single sheet of metal;

a second panel formed from a single sheet of metal;

said first panel fixed to said second panel by a means such as welding thereby forming a duct having an inner wall, an outer wall, a thickness there between said walls, a generally cylindrical inlet end, and a generally rectangular exit end, said inlet end defining a first plane, said exit end defining a second plane, said first plane oriented at an angle to said second plane;

a generally cylindrical inlet sleeve having an inner diameter and outer diameter, said inlet sleeve fixed to said inlet end of said panel assembly;

a generally rectangular aft end frame, said frame fixed to said exit end of said panel assembly; and, a plurality of cooling holes in said panel assembly, each of said cooling holes having a centerline CL and separated from an adjacent cooling hole in the axial and transverse direction by a distance P, said cooling holes extending from said outer wall to said inner wall, each of said cooling holes drilled at an acute surface angle β relative to said outer wall and a transverse angle γ, each of said cooling holes having a first diameter D1 and a second diameter D2, wherein said diameters are measured perpendicular to said said inner wall, and said second diameter D2 is greater than said first diameter D1 such that said cooling hole is generally conical in shape.

2. The transition duct of claim 1 wherein said acute surface angle β is between 15 and 30 degrees from said outer wall.

3. The transition duct of claim 1 wherein said transverse angle γ is between 30 and 45 degrees.

4. The transition duct of claim 1 wherein said first diameter D1 is at least 0.025 inches.

5. The transition duct of claim 1 wherein said second diameter D2 is at least 0.045 inches.

6. The transition duct of claim 1 wherein said cooling holes are drilled in a direction from said outer wall towards said inner wall and angled in a direction towards said aft end frame.

7. The transition duct of claim 1 wherein the distance P in the axial and transverse directions between nearest adjacent cooling holes is at least 0.2 inches.

8. The transition duct of claim 1 wherein said panel assembly, inlet sleeve, and aft end frame are manufactured from a nickel-base superalloy such as Inconnel 625.

9. The transition duct of claim 1 wherein said thickness is at least 0.125 inches.

* * * * *